United States Patent
Büttner et al.

(10) Patent No.: US 11,705,765 B2
(45) Date of Patent: Jul. 18, 2023

(54) MOUNTING A STATOR IN A HOUSING USING SPRING ELEMENTS

(71) Applicant: Siemens Aktiengesellschaft, Munich (DE)

(72) Inventors: Klaus Büttner, Hollstadt (DE); Klaus Kirchner, Ostheim (DE); Matthias Warmuth, Windshausen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 224 days.

(21) Appl. No.: 16/767,963

(22) PCT Filed: Nov. 15, 2018

(86) PCT No.: PCT/EP2018/081412
§ 371 (c)(1),
(2) Date: May 28, 2020

(87) PCT Pub. No.: WO2019/105751
PCT Pub. Date: Jun. 6, 2019

(65) Prior Publication Data
US 2021/0006102 A1     Jan. 7, 2021

(30) Foreign Application Priority Data
Nov. 29, 2017  (EP) .................................. 17204255

(51) Int. Cl.
*H02K 1/18* (2006.01)
(52) U.S. Cl.
CPC .................. *H02K 1/185* (2013.01)

(58) Field of Classification Search
CPC ...................................................... H02K 1/185
(Continued)

(56) References Cited

U.S. PATENT DOCUMENTS 4,701,653 A * 10/1987 Merkle .................. H02K 11/21
310/78
4,894,573 A * 1/1990 Simpson .............. H02K 15/028
310/216.124

(Continued)

FOREIGN PATENT DOCUMENTS

CN   103051080 A   4/2013
CN   203691086 U   7/2014
(Continued)

OTHER PUBLICATIONS

PCT International Search Report and Written Opinion of International Searching Authority dated Mar. 13, 2019 corresponding to PCT International Application No. PCT/EP2018/081412 filed Nov. 15, 2018.

*Primary Examiner* — Alex W Mok
(74) *Attorney, Agent, or Firm* — Henry M. Feiereisen LLC (57) ABSTRACT

An electrical machine includes a housing, a stator, and a rotor. The rotor is mounted relative to the stator for rotation about an axis of rotation. The stator radially outwardly surrounds the rotor. The housing is shrunk onto the stator from radially outside. On its radially outer periphery, the stator includes spring dements which are at least partially elastically deflected radially inwards during shrinking of the housing onto the stator such that the projections rest against the housing with a spring force.

4 Claims, 6 Drawing Sheets

(58) Field of Classification Search
USPC .................................................. 310/216.114
See application file for complete search history.

(56) References Cited

U.S. PATENT DOCUMENTS

| | | | | |
|---|---|---|---|---|
| 5,315,200 | A * | 5/1994 | Lemieux | ................ H02K 1/185 |
| | | | | 310/407 |
| 6,202,286 | B1 | 3/2001 | Schustek et al. | |
| 7,670,079 | B2 * | 3/2010 | Snadden | ................ F16F 1/025 |
| | | | | 403/372 |
| 7,922,419 | B2 * | 4/2011 | Snadden | ................ F16C 27/04 |
| | | | | 403/372 |
| 8,179,028 | B1 | 5/2012 | Rao | |
| 2002/0002777 | A1 * | 1/2002 | Torr | .................. G01D 5/34738 |
| | | | | 73/114.37 |
| 2002/0148123 | A1 * | 10/2002 | Mitterreiter | ............ H02K 11/21 |
| | | | | 33/1 PT |
| 2010/0120543 | A1 * | 5/2010 | Snadden | ................ F16B 21/20 |
| | | | | 464/45 |
| 2010/0187944 | A1 | 7/2010 | Ossenkopp et al. | |
| 2010/0320665 | A1 | 12/2010 | Barnes et al. | |
| 2012/0175996 | A1 * | 7/2012 | Ikuta | ..................... H02K 15/02 |
| | | | | 29/596 |
| 2012/0293025 | A1 | 11/2012 | Suzuki et al. | |
| 2013/0093273 | A1 | 4/2013 | Murakami et al. | |
| 2013/0193801 | A1 * | 8/2013 | Schmid | ................ H02K 1/185 |
| | | | | 310/216.131 |
| 2014/0111043 | A1 * | 4/2014 | Knappenberger | ..... H02K 15/14 |
| | | | | 29/596 |
| 2016/0190877 | A1 * | 6/2016 | Li | .......................... H02K 1/185 |
| | | | | 310/156.01 |

FOREIGN PATENT DOCUMENTS

| | | |
|---|---|---|
| CN | 107104525 A | 8/2017 |
| DE | 19538483 A1 | 4/1997 |
| DE | 10 2008 004 876 A1 | 8/2008 |
| DE | 10 2007 058 072 A1 | 6/2009 |
| DE | 10 2014 100 842 A1 | 7/2015 |
| DE | 10 2015 211 733 A1 | 12/2016 |
| EP | 2 518 334 A1 | 10/2012 |
| GB | 2047130 A | 11/1980 |
| JP | 2007189784 A | 7/2007 |
| JP | 2009033935 A | 2/2009 |
| WO | WO 2004-062067 A1 | 7/2004 |
| WO | WO 2016-090306 A1 | 6/2016 |

\* cited by examiner

MOUNTING A STATOR IN A HOUSING USING SPRING ELEMENTS

CROSS-REFERENCES TO RELATED APPLICATIONS

This application is the U.S. National Stage of International Application No. PCT/EP2018/081412, filed Nov. 15, 20187, which designated the United States and has been published as International Publication No. WO 2019/105751 A1 and which claims the priority of European Patent Application, Serial No. 17204255.8, filed Nov. 29, 2017, pursuant to 35 U.S.C. 119(a)-(d).

BACKGROUND OF THE INVENTION

The present invention is based on an electrical machine,
wherein the electrical machine has a housing, a stator and a rotor,
wherein the rotor is mounted relative to the stator, such that the rotor can be rotated about an axis of rotation,
wherein the stator surrounds the rotor radially on the outside,
wherein the housing is shrunk onto the stator from radially outside,
wherein the stator has on its radially outer periphery spring elements which are at least partially elastically deflected radially inward during shrinking of the housing onto the stator, such that they abut the housing with a spring force.

In electrical machines, the housing is usually shrunk onto the stator or, conversely, the stator is shrunk into the housing. The housing is often made of aluminum, while the stator is made of electric sheets, and thus of steel. Aluminum and steel have different thermal expansion coefficients from one another. In particular, the thermal expansion coefficient of aluminum is greater than that of steel. If the electrical machine is exposed to large temperature fluctuations, the shrink connection between the stator and the housing may loosen at high temperatures of, for example, 100° C. or more such that the stator is no longer held in the housing in a sufficiently torque-proof manner. Conversely, the housing may be overloaded at low temperatures of, for example, −30° C. or less, so that the housing is forced open. An operationally reliable design of the combination of housing and stator is therefore not possible in every application.

In the prior art, the shrink connection between the stator and the housing is often designed such that the housing is not forced open even at low temperatures. In order to reliably maintain the torque-proof connection between the stator and the housing at high temperatures in this case, a positive connection is additionally established between the housing and the stator. For example, a number of bore holes (1, 2, 3 . . . ) can be made in the radial direction through the housing into the stator, wherein a pin is fixed in each of the bore holes.

An electrical machine of the type mentioned in the introduction is known for example from DE 10 2014 100 842 A1. Such electrical machines can also be found in WO 2016/090 306 A1 and WO 2004/062 067 A1.

An electrical machine is known from DE 10 2007 068 072 A1, which has a housing, a stator and a rotor, wherein the rotor is mounted relative to the stator, such that the rotor can be rotated about an axis of rotation. The stator surrounds the rotor radially on the outside and has on its radial outer periphery spring elements which are at least partially elastically deflected radially inward when the housing is shrunk onto the stator, such that they abut the housing with a spring force. A similar disclosure can be found in DE 10 2008 004 876 A1.

The object of the present invention is to modify an electrical machine of the type mentioned in the introduction such that the stator continues to be held and fixed in the housing in a torque-proof manner across a high temperature range.

SUMMARY OF THE INVENTION

According to the invention, the object is achieved by an electrical machine of the type mentioned in the introduction is embodied such that the stator has end plates at its two axial ends, the spring elements are arranged on the end plates and the spring elements are embodied as projections which extend from a flat main element of the respective end plate viewed in the axial direction away from the stator.

Advantageous embodiments of the electrical machine are the subject of dependent claims.

This embodiment has the advantage that no modifications are required on the stator itself, but only the appropriately embodied end plates must additionally be attached to the axial ends of the stator. The attachment of the end plates can easily be carried out to form an advantageous process step in the manufacture of the stator, for example in connection with the stacking of the individual stator laminations of the stator to form a stator laminated core. The connection of the end plates to the stator can in principle be done in any way, for example by stapling, welding, riveting, gluing and suchlike. Viewed in a radial-axial plane, the end plates form a U, the middle leg of which forms the flat main element and the two outer legs of which form the projections. The projections can be tangentially circumferential or interrupted.

The deflection of the spring elements can alternatively be fully elastic or a mixture of elastic and plastic. As a rule, it is sufficient if the extent of the deflection is less than 1 mm. A deflection of 0.2 mm to 0.8 mm is usually sufficient, in particular 0.4 mm to 0.6 mm.

The stator preferably has a free space in each case, viewed from the spring elements radially inward, below the spring elements. As a result, the spring elements can turn aside into the free spaces when the housing is shrunk onto the stator.

When viewed in the axial direction the projections extend over an axial length. The projections are preferably shaped like a roof, such that they abut the housing with the spring force in a central region viewed in the axial direction. As a result, the projections can serve as an insertion aid.

The spring elements are preferably roughened on their surfaces abutting the housing. This results in an improved frictional engagement between the spring elements and the housing. The spring elements grip the housing, so to speak. The spring elements can be roughened, for example, by sandblasting, fluting, knurling, application of granular dust (for example corundum) and other things.

BRIEF DESCRIPTION OF THE DRAWING

The above-described properties, features and advantages of this invention and the manner in which they are achieved will become clearer and more readily understandable in connection with the following description of the exemplary embodiments, which are explained in greater detail in connection with the drawings, in which are shown in a schematic representation:

FIG. 1 an electrical machine in a sectional representation,
FIG. 2 a detail of a stator in a perspective representation, FIG. 3 both axial ends of a stator in a lateral view,
FIG. 4 an axial end from FIG. 3 in a front view,
FIG. 5 a view of a stator in a perspective representation,
FIG. 6 a stator lamination,
FIG. 7 a view of a stator in a perspective representation,
FIG. 8 a view of a stator including the surrounding housing in a perspective representation,
FIG. 9 a part of a stator before shrinking the housing in a perspective representation,
FIG. 10 the part of the stator from FIG. 9 after shrinking the housing in a perspective representation, and
FIG. 11 a stator lamination.

DETAILED DESCRIPTION OF PREFERRED EMBODIMENTS

Figure 1:
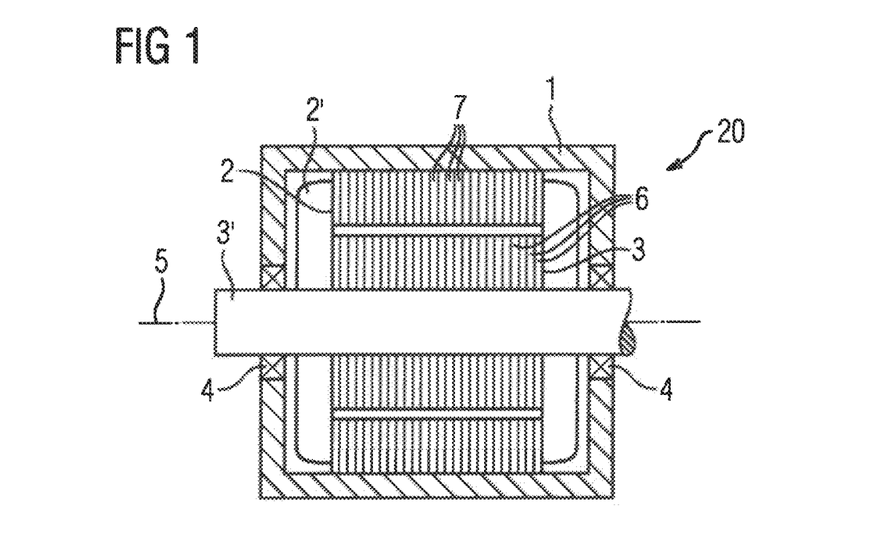

According to FIG. 1, an electrical machine has a housing 1, a stator 2 and a rotor 3. A stator winding 2' is arranged in the stator 2. From the stator winding 2', only the end windings are visible in FIG. 1. The rotor 3—more precisely: a rotor shaft 3', on which the rotor 3 is arranged in a torque-proof manner—is mounted in bearings 4 relative to the stator 2. The rotor 3 can thereby be rotated about an axis of rotation 5.

As far as the terms "axial", "radial" and "tangential" are used below, they always relate to the axis of rotation 5. "Axial" is a direction parallel to the axis of rotation 5. "Radial" is a direction orthogonal to the axis of rotation 5 directly toward or away from the axis of rotation 5. "Tangential" is a direction that runs both orthogonally to the axial direction and also orthogonally to the radial direction. "Tangential" is therefore a direction which, at a constant axial position and with a constant radial distance, is directed circularly around the axis of rotation 5.

The rotor 3 usually consists of a plurality of rotor plates 6, which are stacked on one another when viewed in the axial direction. In the context of the present invention, however, this is of secondary importance. Similarly, the stator 2 consists of a plurality of stator laminations 7, which are stacked on top of one another when viewed in the axial direction. Both the rotor plates 6 (where present) and the stator laminations 7 are made of electric sheet, in other words they are made of sheet steel. The housing 1 can be made of steel, cast iron or aluminum, for example.

The stator 2 surrounds the rotor 3 radially on the outside. The electrical machine is thus designed in the usual way as an internal rotor. In turn, the housing 1 is shrunk onto the stator 2 from radially outside.

The stator 2 has spring elements 8, 12, 15 on its radially outer periphery. The spring elements 8, 12, 15 are not shown in FIG. 1. They are at least partially elastically deflected radially inward when the housing 1 is shrunk onto the stator 2. They thereby abut the housing 1 with a spring force. Possible embodiments of the spring elements 8, 12, 15 are explained in greater detail below in connection with the further figures.

Figure 2:
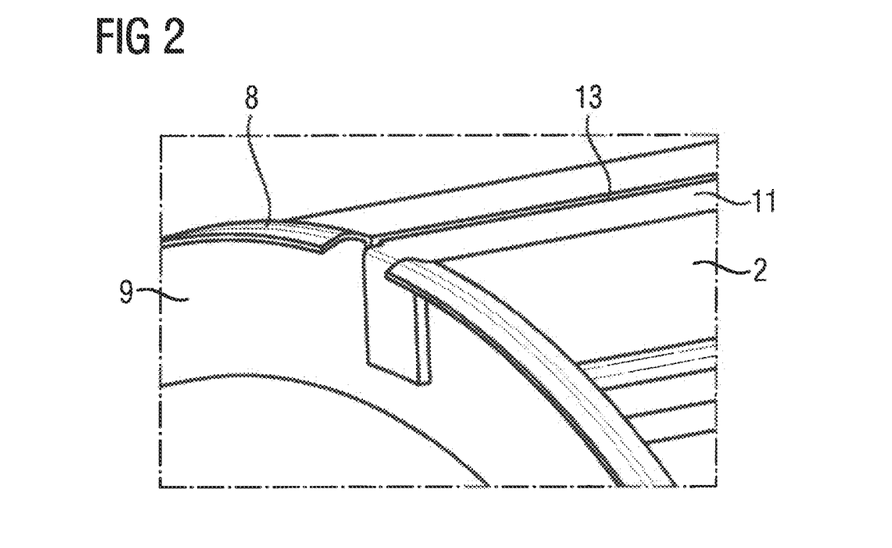
Figure 3:
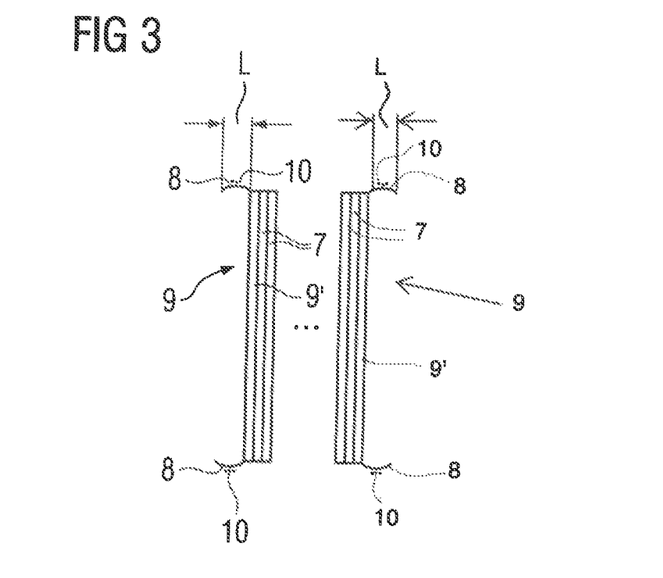
Figure 4:
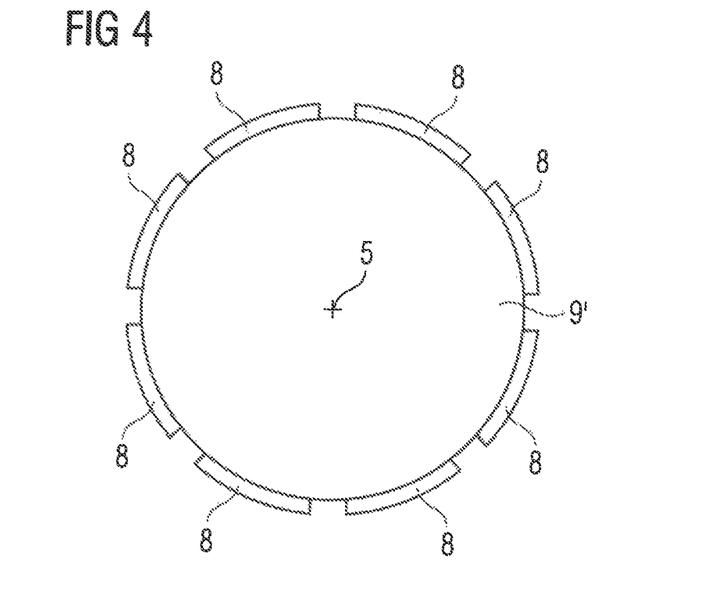

According to FIG. 2 to 4, the stator 2 can have an end plate 9, for example, at each of its two axial ends. In this case the spring elements 8 are arranged on the end plates 9. In particular, the spring elements 8 are embodied according to the representation in FIG. 2 to 4 as projections 8. The projections 8 extend from a flat main element 9' of the respective end plate 9 preferably viewed in the axial direction away from the stator 2. The end plates 9 thus form, as can be seen particularly clearly from FIG. 3, a U in cross-section. If only one of the two radially outer edges is considered, the respective end plate 9 forms an L.

It is possible for the projections 8 to extend in the tangential direction completely about the axis of rotation 5. However, the projections 8 are preferably interrupted. For example, five to ten projections 8 can be present in the tangential direction. The exact number of projections 8 can be selected as required.

As can be seen particularly clearly from FIG. 3, the projections 8, when viewed in the axial direction, extend over an axial length L. Furthermore, the projections 8 also extend radially outward, at least in their region directly adjacent to the end plates 9. However, the projections 8 preferably have a radially outermost region, from which they extend radially inward again with an increasing axial distance from the stator 2. The projections are thus shaped like a roof and in a central region when viewed in the axial direction abut the housing 1 with the spring force. As a result, the projections 8 can serve as an insertion aid when the stator 2 is inserted into the housing 1. The region in which the projections 8 abut the housing 1 is preferably approximately L/2, i.e. half the axial length L of the projections 8.

Due to the fact that the projections 8 extend away from the stator 2 when viewed in the axial direction, there is a free space below the projections 8 when viewed radially inward from the projections 8. The projections 8 can be deflected into this free space when the housing 1 is shrunk onto the stator 2.

As is indicated in FIG. 3 by corresponding dots 10, the projections 8 can be roughened on their surfaces abutting the housing 1. This embodiment improves the frictional adhesion of the stator 2 on the housing 1. Alternatively, the projections 8 can also be embodied with sharp edges.

In the embodiment according to FIG. 2 to 4, the stator 2 has clamp bands 11 which overlap the stator 2 on its radially outer periphery when viewed in the axial direction and press the stator laminations 7 including the end plates 9 together in the axial direction. Such clamp bands 11 are also present in the embodiment according to FIG. 5, which as such is not the subject of the present invention. The end plates 9 are omitted however. Instead, the clamp bands 11 contain the spring elements 12 in the form of corresponding projections 12. The projections 12 extend radially outward according to the representation in FIG. 5.

Figure 5:
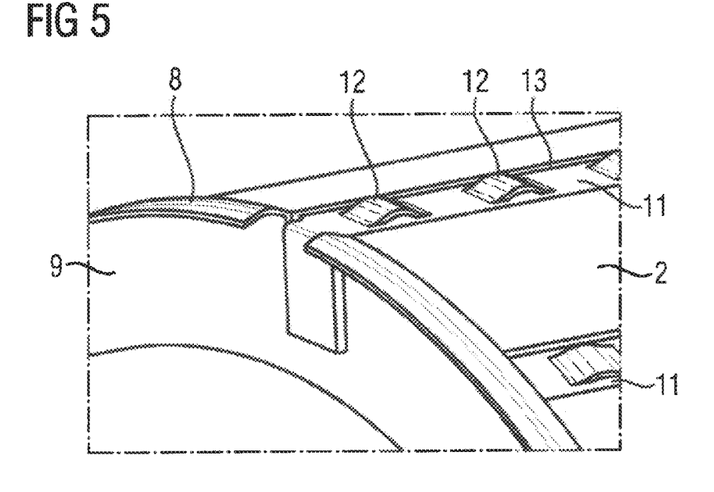

Preferably—this applies both to the embodiment according to FIG. 2 to 4 and to the embodiment according to FIG. 5—the stator 2 has axially running grooves 13 on its radially outer periphery, in which the clamp bands 11 are arranged. The grooves 13 have a depth in the radial direction which is aligned to the (radial) thickness of the clamp bands 11 such that the clamp bands 11 project radially beyond the stator 2 only in the region of the projections 12.

The clamp bands 11 are "empty" in the region below the projections 12. The clamp bands 11 therefore form, in connection with the stator 2 in the region of the projections 12, a free space in each case, which is arranged radially inward below the projections 12 when viewed from the projections 12. The projections 12 can be deflected into these free spaces when the housing 1 is shrunk onto the stator 2.

Analogously to the embodiment according to FIG. 2 to 4, the projections 12 can also be roughened on their surfaces abutting the housing 1. This embodiment improves the frictional adhesion of the stator 2 on the housing 1.

A further embodiment of the present invention will now be explained in connection with FIG. 6 to 8. This embodiment is likewise not the subject of the present invention. In this embodiment, the stator 2 has depressions 14 on its radially outer periphery. In this case, the spring elements 15 can be components of stator laminations 7, which adjoin the depressions 14 in the axial direction. The spring elements 15 can in particular be embodied as tabs 15 which protrude in the radial direction beyond the normal radius r of the stator laminations 7. Conversely, the depressions 14 can be formed as recesses 14, which do not extend as far as the normal radius r of the stator laminations 7. On one (1) tab 15, which is formed by one (1) of the stator laminations 7, this is followed in the axial direction by a depression 14 which is formed by the recesses 14 of a plurality of immediately successive stator laminations 7. The number of immediately successive stator laminations 7 which have the recesses 14 is generally two to six, usually three or five, in rare cases also four.

Figure 6:
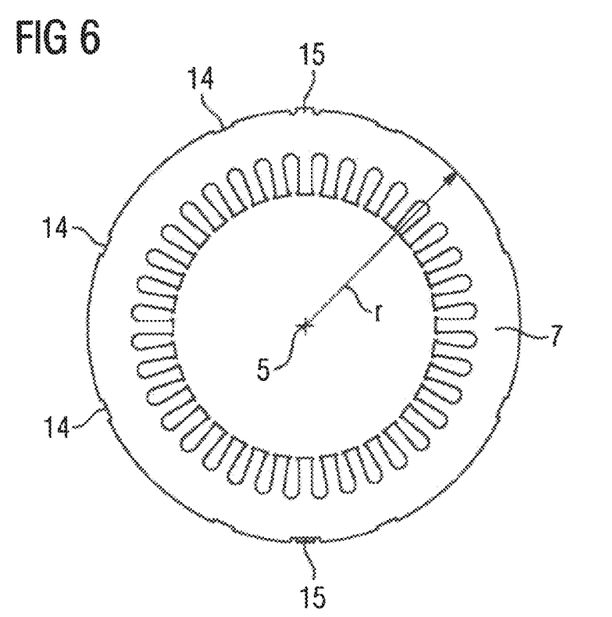
Figure 7:
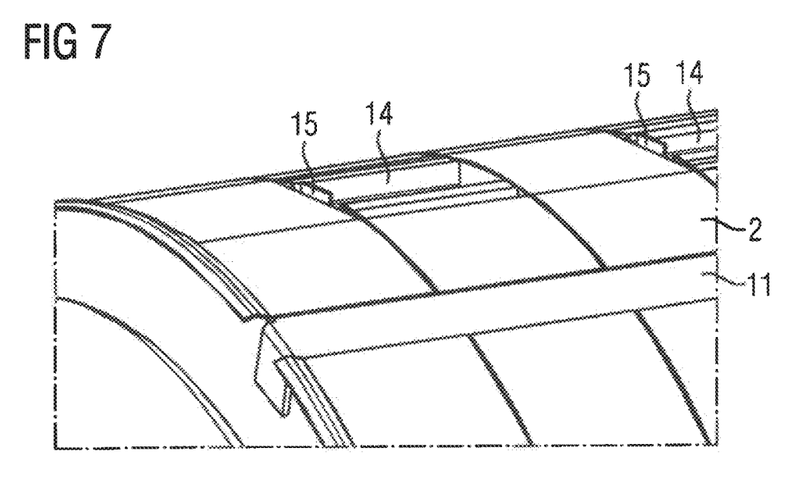
Figure 8:
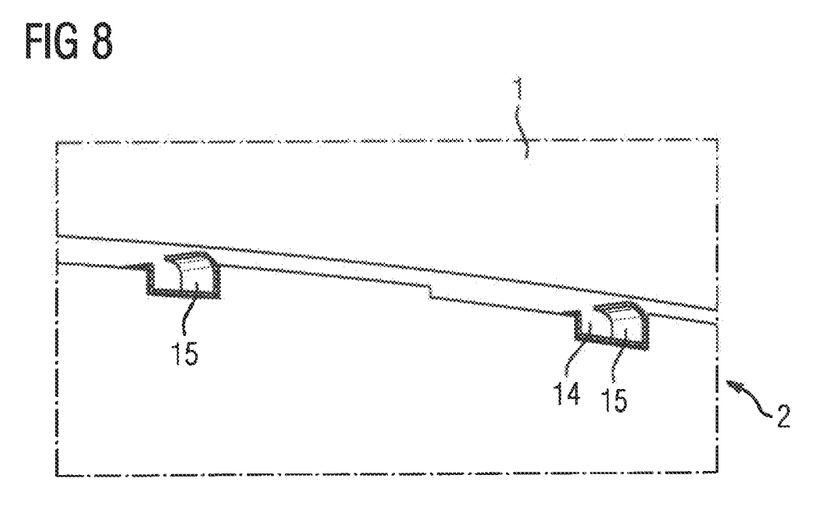

In the case of the embodiment according to FIG. 6 to 8, the spring elements/tabs 15 are deflected in the direction of the depressions 14. There, thanks to the recesses 14, the stator 2 forms, when viewed from the tabs 15 radially inward, a free space below the tabs 15 in each case, into which the tabs 15 are deflected when the housing 1 is shrunk onto the stator 2.

Analogously to the embodiment according to FIG. 2 to 4 and FIG. 5, the tabs 15 can also be roughened on their surfaces which abut the housing 1.

Figure 9:
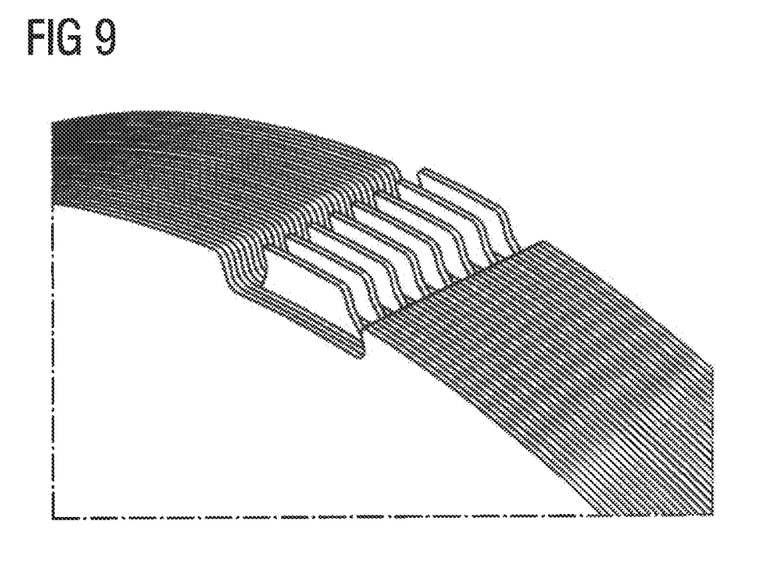
Figure 10:
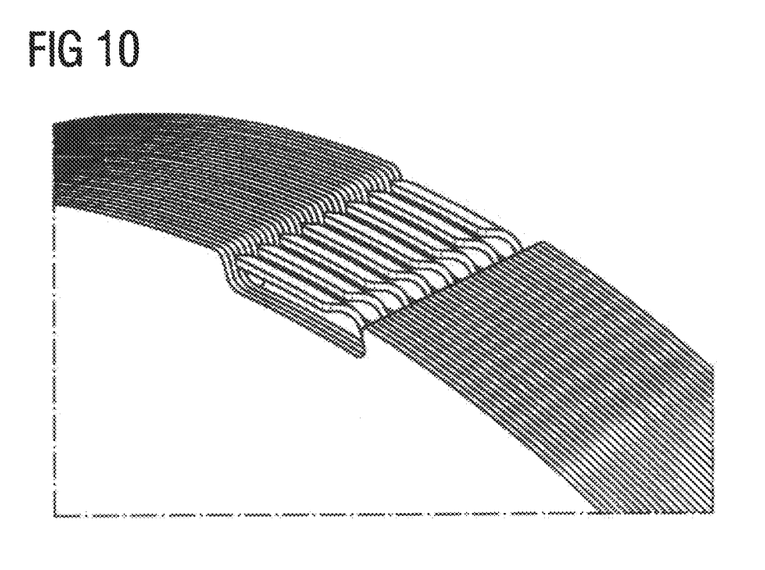
Figure 11:
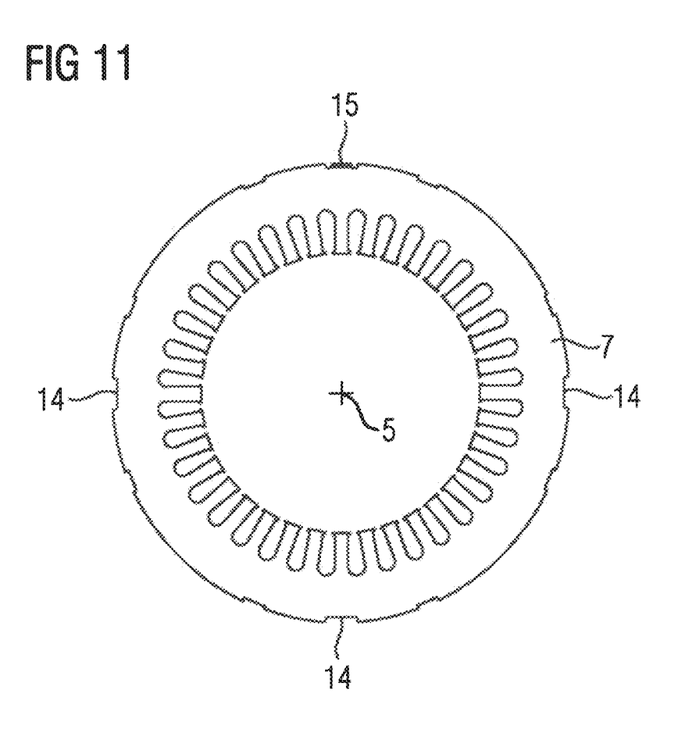

A particularly preferred implementation of the embodiment from FIG. 6 to 8 is explained below in conjunction with FIG. 9 to 11. According to FIG. 9 to 11, the stator laminations 7 each have a number of tabs 15 and a correspondingly larger number of recesses 14. The tabs 15 and the recesses 14 are arranged evenly distributed when viewed in the tangential direction. If, for example, in accordance with the representation in FIG. 9, the stator laminations 7 each have one (1) tab 15 and three recesses 14, the tab 15 and the recesses 14 are each offset by 90° from one another. One of the three recesses 14 is thus diametrically opposite the tab 15, a connecting line of the other two recesses 14 intersects the connecting line of the tab 15 and the diametrically opposite recess 14 orthogonally. Analogously, for example, in an embodiment with one (1) tab 15 and five recesses 14, an angular offset of the tab 15 in respect of the tangentially adjacent recesses 14 and an angular offset of tangentially adjacent recesses 14 would be 60° in each case.

As a rule, the stator lamination 7 will only have a single tab 15. However, in some cases two tabs 15 may also be present. In this case, the tabs 15 are diametrically opposite one another. An angular offset of the tab 15 in respect of the tangentially adjacent recesses 14 and an angular offset of tangentially adjacent recesses 14 would in this case be 45° in each case with three recesses 14 per tab 15, or 30° in each case with five recesses 14 per tab 15.

The present invention has many advantages. In particular, to reliably fix the stator 2 in the housing 1 it is not necessary to carry out further machining operations after fixing the stator 2 in the housing 1. In particular drilling—and thus the creation of drilling chips—can be omitted. There is also no danger of a seal of the interior of the housing 1 being breached by such a bore hole. Water cooling can be readily implemented. In some cases, it is even possible to use a housing 1 with a lower housing wall thickness compared to a comparable electrical machine in the prior art. It may also be possible to increase machining tolerances.

Although the invention has been illustrated and described in detail by the preferred exemplary embodiment, the invention is not restricted by the disclosed examples and other variations can be derived therefrom by a person skilled in the art without departing from the scope of protection of the invention.

What is claimed is:

1. An electrical machine, comprising:
   a stator defining an axis, said stator having two axial ends and including spring elements arranged on a radially outer periphery of the stator;
   a rotor mounted relative to the stator for rotation about an axis of rotation and surrounded by the stator radially on the outside,
   a housing shrunk onto the stator from radially outside such that the spring elements are at least partially elastically deflected radially inward so as to abut the housing with a spring force; and
   end plates respectively attached to each of the two axial ends of the stator, with the spring elements being arranged on the end plates and configured as projections which extend in a direction of the axis from a flat main element of the end plates away from the stator.

2. The electrical machine of claim 1, wherein the spring elements define a free space located radially inward from the spring elements.

3. The electrical machine of claim 1, wherein the projections have an axial length and are shaped like a roof to define a central region via which the projections abut the housing with the spring force.

4. The electrical machine of claim 1, wherein the spring elements have surfaces in abutting relationship to the housing, said surfaces being roughened.

* * * * *